3,265,686
2-AMINOMETHYLENE-3-OXO STEROIDS AND
PREPARATION THEREOF
Raymond O. Clinton, East Greenbush, N.Y., assignor to
Sterling Drug Inc., New York, N.Y., a corporation of
Delaware
No Drawing. Filed Jan. 27, 1960, Ser. No. 4,882
30 Claims. (Cl. 260—239.5)

This invention relates to steroids and in particular is concerned with 2-aminomethylene substituted 3-oxo-steroids and the preparation thereof.

The compounds of the invention are defined as 3-oxo-steroids having from seventeen to about twenty-three carbon atoms exclusive of ester radicals and being further substituted in the 2-position by the grouping $$B=N-C(R)=$$

wherein B=N is a basic amino radical, and R represents hydrogen or a lower-alkyl radical.

The exact nature of the steroid moiety is not critical. The utility of steroids, including those exhibiting hormonal or other pharmacological or endocrinological properties, is well-known. Such steroid moieties have from seventeen to about twenty-three carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid. The steroid moiety can be any member of the androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, optionally together with a hydroxy group at $C_{17}$, characteristic of the progrestational and adrenal cortical steroids. The steroid moiety can also have one or more substituents at other positions of the nucleus, for example, hydroxy, acyloxy, or oxo radicals at positions 6, 7, 11, 12, 14 or 16; halogen atoms, preferably fluorine or chlorine, for example, at the 4-, 6-, 7-, 9-, 12- or 21-positions; and lower-alkyl groups, for example, at the 4-, 6-, 7-, 11- or 16-positions. The steroid moiety can also have one or more double bonds, especially at the 4,5- and/or 6,7-positions. The steroid moiety usually possesses angular methyl groups at $C_{10}$ and $C_{13}$, although 18- and 19-nor-steroids and 18,19-bisnor-steroids, lacking one or both of the angular methyl groups at $C_{13}$ and $C_{10}$, respectively, are also contemplated.

The 18,19-bisnor-steroid, 18- or 19-nor-steroid, and normal steroid moieties in the compounds of the invention contain respectively, seventeen, eighteen and nineteen carbon atoms plus any carbon content which may be provided by one or more nuclearly substituted hydrocarbon radicals, up to and including a total of about twenty-three carbon atoms.

When acyloxy radicals are present in the steroid moiety, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated.

In the 2-(1-aminoalkylidene) substituent $$B=N-C(R)=$$

the portion B=N stands for primary amino ($H_2N$) or a basic secondary or tertiary amino radical having a molecular weight less than about 200. By a secondary amino radical is meant a radical of the type YHN— wherein Y is an organic substituent so that the complete molecule to which it is attached is a secondary amine. By a tertiary amino radical is meant a radical of the type YY'N— wherein Y and Y' are both organic substituents so that the complete molecule to which it is attached is a tertiary amine. Basic amino radicals are those of the aliphatic or araliphatic type that impart to the molecules which contain them sufficient basicity so that the compounds readily form acid-addition salts with strong inorganic and organic acids. A particularly preferred group of amino radicals are primary amino ($H_2N$); lower-alkylamino, for example, methylamino and ethylamino; cycloalkylamino in which the cycloalkyl has from 3 to 7 ring members, for example, cyclopropylamino, cyclopentylamino, cyclohexylamino and cycloheptylamino; phenyl-lower-alkylamino, for example, benzylamino and phenylethylamino; di-lower-alkylamino, for example, dimethylamino and diethylamino; dicycloalkylamino in which cycloalkyl has from 3 to 7 ring members, for example, dicyclopentylamino and dicyclohexylamino; N-(cycloalkyl)-lower-alkylamino in which the cycloalkyl has from 3 to 7 ring members, for example, N-methylcyclohexylamino and N-ethylcyclopentylamino; polymethylenimino having from 5 to 7 ring members, for example, 1-pyrrolidyl, 1-piperidyl, hexamethylenimino and lower-alkylated derivatives thereof; 4-morpholinyl; di-(phenyl-lower-alkyl)amino, for example, dibenzylamino and bis(phenylethyl)amino; N-(phenyl-lower-alkyl)-lower-alkylamino, for example, N-benzylmethylamino; di-lower-alkylamino-lower-alkylamino, for example, dimethylaminoethylamino; and polymethylenimino-lower-alkylamino, for example, 1-piperidylethylamino. In the foregoing radicals, the term lower-alkyl stands for alkyl groups containing from one to about six carbon atoms with the additional proviso that in the di-lower-alkylamino-lower-alkylamino and polymethylenimino-lower-alkylamino radicals, the two nitrogens are separated by at least two carbon atoms.

The compounds of the invention are prepared by reacting a 2-(1-hydroxyalkylidene)-3-oxo-steroid with ammonia or a basic amine, B=NH, according to the following equation:

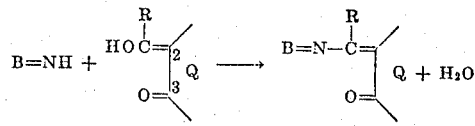

wherein Q represents the remaining portion of the steroid moiety described above. The condensation takes place by heating the 2-(1-hydroxyalkylidene)-3-oxo-steroid with at least one molar equivalent of the amine B=NH in an inert solvent or reaction medium at a temperature between about 50° C. and 150° C. The nature of the inert solvent is not critical, although hydrocarbon solvents such as benzene, toluene or xylene, or lower-alkanols, e.g., ethanol are preferred.

A particularly preferred group of compounds comprises 2-(1-aminoalkylidene)-3-oxo-steroids of the androstane or etiocholane series, in which the steroid moiety has from seventeen to about twenty-three carbon atoms exclusive of ester radicals, including those having the structural formula

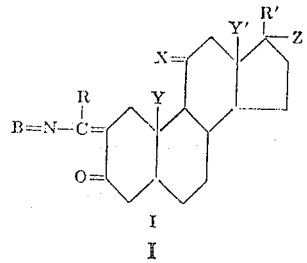

I wherein R represents hydrogen or lower-alkyl; R' represents hydrogen, lower-alkyl, lower-alkenyl, lower-alkenyl, acetyl, ketalized acetyl, hydroxyacetyl, ketalized hydroxyacetyl, 1,2-dihydroxyethyl or 1-hydroxyethyl; X is selected from the group consisting of H$_2$, (H)(OH) and O; Y and Y' represent hydrogen or methyl; Z represents hydrogen or hydroxy, Z being restricted to hydroxy when R' represents hydrogen, lower-alkyl, lower-alkenyl or lower-alkynyl; and B=N represents primary amino, or basic secondary and tertiary amino having a molecular weight less than about 200. Also contemplated are carboxylic acid esters of the compounds possessing hydroxy groups, as well as those having one double bond in the 4,5-position (Formula II below), and those having two double bonds, one in the 4,5-position and the other in the 6,7-position (Formula IIa below):

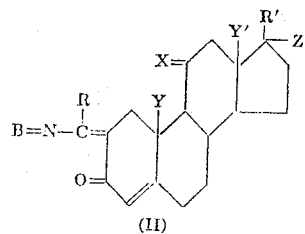

(II)

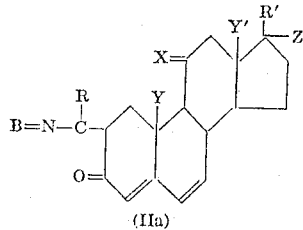

(IIa)

In the above general Formulas I and II, R', when it epresents lower-alkyl, lower-alkenyl or lower-alkynl, has rom one to about four carbon atoms and may be straight r branched, and thus includes such groups as methyl, thyl, propyl, isopropyl, butyl, isobutyl, tertiary-butyl, inyl, 1-propenyl, 2-propenyl, ethynyl, propargyl, and the ke.

The compounds of Formulas I, II and IIa are prepared by reacting the appropriate 2-(1-hydroxyalkylidene)-3-oxo-steroid, viz.:

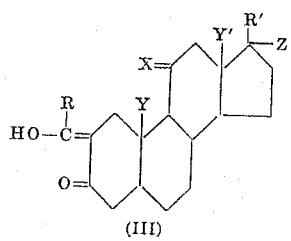

(III)

or the corresponding compounds where a double bond is present in the 4,5-position, or two double bonds in the 4,5- and 6,7-positions, with an amine B=NH: B=N, R, R', X, Z, Y and Y' having the same meanings given above, except that when the steroid moiety contains oxo groups in addition to the one at position 3, they are preferably protected as a ketal derivative to prevent possible side reactions with the amine and especially to permit formation of the intermediate hydroxyalkylidene compound without acylation in positions other than the 2-position. For example, when compounds in which R' represents acetyl or hydroxyacetyl are desired, these radicals are preferably ketalized by known methods, e.g., with ethylene glycol, prior to introduction of the hydroxyalkylidene radical at the 2-position and reaction with an amine. The 20-monoketals of 3,20-dioxosteroids are prepared from the 3,20-diketals by selective hydrolysis by known methods, e.g., by allowing the diketal to stand at room temperature in acetone solution containing a trace of p-toluenesulfonic acid. The ketal groups are readily cleaved by dilute acid either before or after the condensation with an amine. Alternatively, 20-monoketals of 3,20-dioxosteroids are produced by preparing the 20-ketal of a 3-hydroxy-20-oxosteroid and oxidizing the 3-hydroxy group to a 3-oxo group by means of chromic oxide in pyridine. It has been found, however, that 3,20-dioxosteroids bearing hydroxy groups at the 17- and 21-positions can be selectively formylated in the 2-position without protecting the 20-oxo group by ketalization, particularly if the 21-hydroxy group is etherified with a trityl or pyranyl radical. An oxo group at the 11-position is relatively unreactive and need not be protected before reaction with an amine or a derivative thereof.

As a variant on ketal formation, in the case where R' is hydroxyacetyl and Z is OH, characteristic of cortisone and related cortical hormones, the side chain can be protected against formylation by first converting the compound to the 17,20: 20,21-bismethylenedioxy derivative by reacting it with formaldehyde in the presence of strong acid by known methods.

The compounds of the invention are useful as intermediates in the preparation of different species within the scope of the invention by introduction of new groups or alteration of groups already present in the steroid nucleus by known methods. For example, a 2-(1-aminoalkylidene)-steroid having a hydroxy group in the 17-position of the steroid nucleus can be oxidized to the corresponding 17-oxo compound. As another instance, a compound having a 1-hydroxyethyl radical in the 17-position [I or II; R' is CH$_2$CH(OH)—, Z is H or OH] can be oxidized to the corresponding 17-acetyl compound [I or II; R' is CH$_3$CO—, Z is H or OH].

The intermediate 2-(1-hydroxyalkylidene)-3-oxo-steroids are prepared by condensing a 3-oxo-steroid with a lower-alkyl lower-alkanoate, RCOOR", wherein R is hydrogen or lower-alkyl and R" is lower-alkyl in the presence of a strong base under anhydrous conditions. The strong base is preferably an alkali metal lower-alkoxide, amide or hydride. An acyl group enters the 2-position with elimination of a molecule of an alcohol as follows:

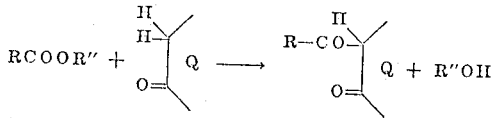

The 2-acyl steroid in solution is in tautomeric equilibrium with its enol form (hydroxyalkylidene, HO—C(R)=), and the latter form is the one chosen for convenience in the structural formulas given elsewhere in this specification.

In the case wherein the radical R is lower-alkyl an alternative and preferred method comprises treating the 3-oxosteroid with a lower-alkanoic acid anhydride in the presence of boron trifluoride. Steroids containing a 17- hydroxy group, particularly the 17-hydroxy-17-alkyl steroids, can be protected against dehydration by prior esterification. The 2 - (1 - hydroxyalkylidene) - 3-oxo-steroids are disclosed in my copending application, Serial No. 793,292, filed February 16, 1959.

The compounds of the invention are basic in character and will form acid-addition salts upon addition of strong acids. Those compounds which are tertiary-amines will also form quaternary ammonium salts upon addition of esters of strong acids. These salts are the full equivalent of the corresponding free bases insofar as their physiological properties are concerned. Both the free base and salt forms are considered to be one and the same invention.

The acid-addition salts are prepared by causing the 2-(1-aminoalkylidene)-steroid to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing a 2-(1-tertiary-aminoalkylidene)-steroid to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the 2-(1-tertiary-aminoalkylidene)-steroid and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the 2-(1-aminoalkylidene)-steroid, and serve as intermediates for non-toxic quaternary salts by conventional ion exchange reactions. All acid-addition salts, regardless of the nature of the anions, are useful as intermediates in the purification of the free bases.

Endocrinological studies of the compounds of the invention have shown that they possess useful metabolic, hormonal and anti-hormonal properties. In particular they exhibit anabolic and pituitary inhibiting activities. Anabolic agents are useful in the treatment of conditions arising from poor nitrogen utilization. Pituary inhibiting agents are useful in the treatment of endocrinological disorders brought about by hormonal imbalance.

Pharmacological evaluation has demonstrated that compounds of the invention also possess hypotensive properties thus indicating their usefulness in lowering blood pressure.

The compounds of the invention can be prepared for use by dispersing them in an aqueous suspension or by dissolving them in a pharmacologially acceptable oil or oil-water emulsion for parenteral administration; or by incorporation in tablet form with excipients for oral administration.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1

2 - [(1 - pyrrolidyl)methylene] - 4-androsten-17β-ol-3-one [II; R is H, R' is H, X is $H_2$, Y and Y' are $CH_3$, Z is OH, B=N is $(CH_2)_4N$].

A mixture of 11.7 g. of 2-hydroxymethylene-4-androsten-17β-ol-3-one, 2.11 g. of pyrrolidine and 100 ml. of benzene was refluxed for three hours in a Bidwell-Sterling moisture trap apparatus to collect the water formed in the reaction. The reaction mixture was concentrated in vacuo, the residue dissolved in benzene, and the benzene solution washed with 5% potassium hydroxide solution and concentrated in vacuo. The residue was dissolved in benzene and chromatographed on a column of 450 g. of basic alumina. The column was eluted with the solvent series benzene-ether-methanol. Elution with ether-methanol (99:1) brought out the crystalline product, which when recrystallized first from acetone and then from an acetone-methanol mixture and dried at 80° C. for twenty-four hours in vacuo gave 2-[(1-pyrrolidyl)methylene]-4-androsten-17β-ol-3-one in the form of yellow-orange prisms, M.P. 214.0–225.6° C. (corr.), $[\alpha]_D^{23}$=—50.8° (1% in chloroform); ultraviolet maxima at 250 and 372 mμ (E=17,600 and 15,300).

*Analysis.*—Calcd. for $C_{24}H_{35}NO_2$: C, 78.00; H, 9.55; N, 3.79. Found: C, 77.93; H, 9.54; N, 3.71.

2-[(1-pyrrolidyl)methylene]-4-androsten-17β-ol-3 - one reacts with hydrochloric acid, hydrobromic acid, sulfuric acid, phosphoric acid, tartaric acid, quinic acid, naphthalenesulfonic acid, methyl iodide, ethyl bromide, allyl bromide, benzyl chloride, or 2-chlorobenzyl chloride to give the hydrochloride, hydrobromide, sulfate (or bisulfate), phosphate (or acid phosphate), tartrate (or bitartrate), quinate, naphthalenesulfonate, methiodide, ethobromide, allobromide, benzochloride, or 2-chlorobenzochloride salts, respectively.

2 - [(1 - pyrrolidyl)methylene] - 4 - androsten - 17β-ol-3-one can be reacted with acetic anhydride, propionic anhydride, caproyl chloride, succinic anhydride, β-cyclopentylpropionyl chloride, benzoyl chloride, p-nitrobenzoyl, chloride, 3,4,5-trimethoxybenzoyl chloride, phenylacetyl chloride, or cinnamoyl chloride, by heating in the presence of pyridine, to give, respectively, 17β-acetoxy-2-[(1-pyrrolidyl)methylene]-4-androsten-3-one,
17β-propionoxy-2-[(1-pyrrolidyl)methylene]-4-androsten-3-one,
17β-caproyloxy-2-[(1-pyrrolidyl)methylene]-4-androsten-3-one,
17β-(β-carboxypropionoxy)-2-[(1-pyrrolidyl)methylene]-4-androsten-3-one,
17β-(β-cyclopentylpropionoxy)-2-[(1-pyrrolidyl)-methylene]-4-androsten-3-one,
17β-benzoyloxy-2-[(1-pyrrolidyl)methylene]-4-androsten-3-one,
17β-(p-nitrobenzoyloxy)-2-[(1-pyrrolidyl)methylene]-4-androsten-3-one,
17β-(3,4,5-trimethoxybenzoyloxy)-2-[(1-pyrrolidyl)-methylene]-4-androsten-3-one,
17β-phenylacetoxy-2-[(1-pyrrolidyl)methylene]-4-androsten-3-one, or
17β-cinnamoyloxy-2-[(1-pyrrolidyl)methylene]-4-androsten-3-one.

EXAMPLE 2

2 - [(n - hexyl)aminomethylene] - 4 - androsten - 17β-ol-3-one [II; B=N is $CH_3(CH_2)_5NH$] can be prepared by replacing the pyrrolidine in Example 1 by a molar equivalent amount of n-hexylamine.

EXAMPLE 3

2 - (benzylaminomethylene) - 4 - androsten - 17β - ol-3-one [II; B=N is $C_6H_5CH_{25}NH$] can be prepared by replacing the pyrrolidine in Example 1 by a molar equivalent amount of benzylamine.

EXAMPLE 4

2 - (cyclopropylaminomethylene) - 4 - androsten - 17β-ol-3-one [II; B=N is $(CH_2)_2CHNH$] can be prepared by replacing the pyrrolidine in Example 1 by a molar equivalent amount of cyclopropylamine.

EXAMPLE 5

2 - (cyclohexylaminomethylene) - 4 - androsten - 17β-ol-3-one [II; B=N is $(CH_2)_5CHNH$] can be prepared by replacing the pyrrolidine in Example 1 by a molar equivalent amount of cyclohexylamine.

EXAMPLE 6

2 - (cycloheptylaminomethylene) - 4 - androsten - 17β-ol-3-one [II; B=N is $(CH_2)_6CHNH$] can be prepared by replacing the pyrrolidine in Example 1 by a molar equivalent amount of cycloheptylamine.

EXAMPLE 7

2 - (dicyclohexylaminomethylene) - 4 - androsten - 17β-ol-3-one [II; B=N is $(C_6H_{11})_2N$] can be prepared by replacing the pyrrolidine in Example 1 by a molar equivalent amount of dicyclohexylamine.

EXAMPLE 8

2 - [N - (cyclohexyl)methylaminomethylene] - 4 - androsten-17β-ol-3-one [II; B=N is $(C_6H_{11})(CH_3)N$] can be prepared by replacing the pyrrolidine in Example 1 by a molar equivalent amount of N-(cyclohexyl)methylamine.

EXAMPLE 9

2 - [(4-morpholinyl)methylene] - 4 - androsten - 17β-ol-3-one [II; B=N is $O(CH_2)_4N$] can be prepared by replacing the pyrrolidine in Example 1 by a molar equivalent amount of morpholine.

EXAMPLE 10

2 - [N - (benzyl)methylaminomethylene] - 4 - androsten-17-ol-3-one [II; B=N is $(C_6H_5CH_2)(CH_3)N$] can be prepared by replacing the pyrrolidine in Example 1 by a molar equivalent amount of N-(benzyl)methylamine.

EXAMPLE 11

2 - [β - (3,4 - dimethoxyphenyl)ethylaminomethylene]-4-androsten-17β-ol-3-one [II; B=N is

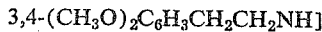

$3,4-(CH_3O)_2C_6H_3CH_2CH_2NH$]

can be prepared by replacing the pyrrolidine in Example 1 by a molar equivalent amount of β-(3,4-dimethoxyphenyl)ethylamine.

EXAMPLE 12

2 - [β - hydroxy - β - (4 - hydroxyphenyl)ethylaminomethylene]-4-androsten-17β-ol-3-one [II; B=N is $4-HOC_6H_4CH(OH)CH_2NH$]

can be prepared by replacing the pyrrolidine in Example 1 by a molar equivalent amount of β-hydroxy-β-(4-hydroxyphenyl)ethylamine.

EXAMPLE 13

2 - [2 - (1 - piperidyl)ethylaminomethylene] - 4 - androsten-17β-ol-3-one [II; B=N is $(CH_2)_5NCH_2CH_2NH$] can be prepared by replacing the pyrrolidine in Example 1 by a molar equivalent amount of 2-(1-piperidyl)ethylamine.

EXAMPLE 14

2 - [(1 - pyrrolidyl)methylene] - 17α - methylandrostan-17β-ol-3-one [I; R is H, R' is $CH_3$, X is $H_2$, Y and

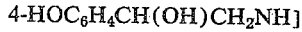

Y' are $CH_3$, Z is OH, B=N is $(CH_2)_4N$] was prepared from 3.00 g. of 2-hydroxymethylene-17α-methylandrostan-17β-ol-3-one and 1 ml. of pyrrolidine in 200 ml. of benzene according to the manipulative procedure described above in Example 1. There was thus obtained 3.17 g. of 2-[(1-pyrrolidyl)methylene]-17α-methylandrostan-17β-ol-3-one, which after three recrystallizations from ethyl acetate and drying at 90° C. for eight hours in vacuo had the M.P. 224.2–231.6° C., $[\alpha]_D^{25} = -109.6° \pm 0.2°$ (1% in chloroform); ultraviolet maximum at 339 mμ (E=23,400).

*Analysis.*—Calcd. for $C_{25}H_{39}NO_2$: C, 77.87; H, 10.20; N, 3.63. Found: C, 77.99; H, 9.92; N, 3.63.

2 - [(1 - pyrrolidyl)methylene] - 17α - methylandrostan-17β-ol-3-one, when tested by the method of Minatoya et al., Arch. Internat. de Pharmacodynamie et de Therapie, 108, 102–28 (1956), was found to be an active hypotensive agent at a dose level of 200 mg./kg., producing a maximum fall of 32.8 mm. Hg in blood pressure after twenty-four hours, when administered orally as an aqueous suspension in renal hypertensive rats.

EXAMPLE 15

2 - [(1 - hexamethylenimino)methylene] - 17α - methylandrostan - 17β - ol - 3 - one [I; R is H, R' is $CH_3$, X is $H_2$, Y and Y' are $CH_3$, Z is OH, B=N is $(CH_2)_6N$] was prepared from 5.00 g. of 2-hydroxymethylene-17α-methylandrostan-17β-ol-3-one and 1.65 g. of hexamethylenimine in 300 ml. of benzene according to the manipulative procedure described above in Example 1. The product was recrystallized successively from methanol, ethyl acetate-ether, ethyl acetate and methanol-ether and dried at 85° C. for eight hours in vacuo to give 2-[(1-hexamethylenimino)methylene] -17α - methylandrostan - 17β - ol - 3-one, M.P. 219.0–222.6° C. (corr.), $[\alpha]_D^{25} = -205.0°$ (1% in chloroform); ultraviolet maximum at 334 mμ (E=23,300).

*Analysis.*—Calcd. for $C_{27}H_{43}NO_2$: C, 78.40; H, 10.48; N, 3.39. Found: C, 78.70; H, 10.43; N, 3.40.

EXAMPLE 16

2 - [(1 - piperidyl)methylene] - 17α - methylandrostan-17β-ol-3-one [I; R is H, R' is $CH_3$, X is $H_2$, Y and $Y_2$ are $CH_3$, Z is OH, B=N is $(CH_2)_5N$].

A mixture of 1.8 g. of 2-hydroxymethylene-17α-methylandrostan-17β-ol-3-one, 1.7 g. of piperidine, 25 ml. of acetone and 1.2 g. of acetic acid was refluxed for seventy-two hours. The product which separated upon cooling the reaction mixture was collected by filtration, and the 1.55 g. of product was recrystallized from 95% ethanol and dried at 80° C. for eight hours in vacuo to give 2-[(1 - piperidyl)methylene]-17α-methylandrostan - 17β-ol-3-one in the form of yellow plates, M.P. 232.0–239.2° C., $[\alpha]_D^{25} = -266.8°$ (1% in chloroform).

*Analysis.*—Calcd. for $C_{26}H_{41}NO_2$: C, 78.14; H, 10.34; N, 3.51. Found: C, 77.98; H, 10.07; N, 3.43.

EXAMPLE 17

2 - [(2 - diethylaminoethylamino)methylene] - 17α-methyl-4-androsten-17β-ol-3-one [II; R is H, R' is $CH_3$, X is $H_2$, Y and Y' are $CH_3$, Z is OH, B=N is

$(C_2H_5)_2NCH_2CH_2NH$]

was prepared from 5.00 g. of 2-hydroxymethylene-17α-methyl-4-androsten-17β-ol-3-one and 1.93 g. of 2-diethylaminoethylamine in 200 ml. of benzene according to the manipulative procedure described above in Example 1. The 4.21 g. of product, M.P. 170–175° C. (uncorr.), thus obtained was chromatographed on 180 g. of alumina and then recrystallized successively from acetone, ether-methanol and acetone and dried at 90° C. for eight hours in vacuo to give 2-[(2-diethylaminoethylamino)methylene]-17α-methyl-4-androsten-17β-ol-3-one, M.P. 181.4–184.4° C. (corr.), $[\alpha]_D^{25} = 101.5° \pm 0.4°$ (1% in chloroform); ultraviolet maxima at 248 and 366 mμ (E=16,320 and 14,700).

*Analysis.*—Calcd. for $C_{27}H_{44}N_2O_2$: C, 75.65; H, 10.35; N, 6.54. Found: C, 75.90; H, 10.12; N, 6.46.

EXAMPLE 18

2-[(1 - methyl - 1-piperidyl)methylene]-17α-methyl-4-androsten-17β-ol-3-one [II; is H, R' is CH$_3$, X is H$_2$, Y and Y' are CH$_3$, Z is OH, B=N is 2-methyl-1-piperidyl] was prepared from 5.50 g. of 2-hydroxymethylene-17α - methyl-4-androsten-17β-ol-3-one and 1.81 g. of 2-methylpiperidine in 200 ml. of benzene according to the manipulative procedure described above in Example 1. The product was chromatographed on 200 g. of alumina and eluted with benzene-ether to give 3.17 g. of 2-[(2-methyl-1-piperidyl)-methylene] - 17α - methyl - 4 - androsten-17β-ol-3-one, M.P. 199.6–214.2° C. (corr.), when recrystallized twice from acetone, $[\alpha]_D^{25} = -322.9°$ ±0.3° (1% in chloroform); ultraviolet maxima at 248 and 373 mμ (E=17,400 and 15,200).

*Analysis.*—Calcd. for C$_{27}$H$_{41}$NO$_2$: C, 78.78; H, 10.04; N, 3.40. Found: C, 78.61; H, 9.81; N, 3.41.

EXAMPLE 19

2-(diethylaminoethylene)etiocholan - 17β - ol - 3 - one [I; R is H, R' is H, X is H$_2$, Y and Y' are CH$_3$, Z is OH, B=N is (C$_2$H$_5$)$_2$N] was prepared from 4.9 g. of 2-hydroxymethyleneetiocholan-17β-ol-3-one and 1.5 g. of diethylamine in 75 ml. of benzene according to the manipulative procedure described above in Example 1. There was thus obtained 3.9 g. of 2-(diethylaminomethylene)etiocholan-17β-ol-3-one, M.P. 181.6–188.4° C. (corr.) when recrystallized from ether, $[\alpha]_D^{25} = +232.4°$ (1% in chloroform); ultraviolet maximum at 333 mμ (E=21,500).

*Analysis.*—Calcd. for C$_{24}$H$_{39}$NO$_2$: C, 77.18; H, 10.44; N, 3.75. Found: C, 77.25; H, 10.74; N, 3.72.

2-(diethylaminomethylene)etiocholan-17β-ol - 3 - one, when tested by the method of Minatoya et al., loc. cit., showed an average drop of 32–35 mm. Hg in blood pressure after four to six hours when administered orally to rats at dose levels of 10–100 mg./kg. Upon subcutaneous administration similar effects were obtained at dose levels of 2.5–10 mg./kg. The hypotensive effect was of long duration.

EXAMPLE 20

2 - (diethylaminomethylene) - 17α - methyletiocholan-17β-ol-3-one [I; R is H, R' is CH$_3$, X is H$_2$, Y and Y' are CH$_3$, Z is OH, B=N is (C$_2$H$_5$)$_2$N] was prepared from 2-hydroxymethylene - 17α - methyletiocholan-17β-ol-3-one and diethylamine according to the manipulative procedure described above in Example 1. The product was obtained in the form of pale yellow prisms, M.P. 176.4–180.2° C. (corr.) when recrystallized from acetone and dried at 80° C. for fifteen hours in vacuo, $[\alpha]_D^{25} = +195.6° \pm 0.1°$ (1% in chloroform); ultraviolet maximum at 333 mμ (E=22,600).

*Analysis.*—Calcd. for C$_{25}$H$_{41}$NO$_2$: C, 77.46; H, 10.66; N, 3.61; O, 8.26. Found: C, 77.80; H, 10.55; N, 3.60; O, 8.40.

EXAMPLE 21

2 - [(1 - piperidyl)methylene] - 17α-methyletiocholan-17β-ol-3-one [I; R is H, R' is CH$_3$, X is H$_2$, Y and Y' are CH$_3$, Z is OH, B=N is (CH$_2$)$_5$N] was prepared from 2-hydroxymethylene - 17α - methyletiocholan - 17β-ol-3-one and piperidine according to the manipulative procedure described above in Example 1. The product was recrystallized from acetone to give 2-[(1-piperidyl)methylene] - 17α-methyletiocholan-17β-ol-3-one in the form of pale yellow short needles, M.P. 190.2–198.0° C. (corr.), $[\alpha]_D^{25} = +236.3°$ (1% in chloroform); ultraviolet maximum at 334 mμ (E=21,900).

*Analysis.*—Calcd. for C$_{26}$H$_{41}$NO$_2$: C, 78.18; H, 10.34; N, 3.50. Found: C, 78.21; H, 10.31; N, 3.44.

2-[(1-piperidyl)methylene] - 17α - methyletiocholan-17β-ol-3-one, when tested by the method of Minatoya et al., loc. cit., showed an average drop of 13 mm. Hg in blood pressure when administered orally to rats at a dose level of 100 mg./kg.

EXAMPLE 22

2-(di - n-butylaminomethylene)-17α-methyletiocholan-17β-ol-3-one [I; R is H, R' is CH$_3$, X is H$_2$, Y and Y' are CH$_3$, Z is OH, B=N is (n-C$_4$H$_9$)$_2$N] was prepared from 2-hydroxymethylene - 17α - methyletiocholan-17β-ol-31-one and di-n-butylamine according to the manipulative procedure described above in Example 1. The product was recrystallized twice from an ether-pentane mixture to give 2-(di - n - butylaminomethylene)-17α-methyletiocholan-17β-ol-3-one in the form of pale yellow short needles, M.P. 140.4–143.2° C. (corr.), $$[\alpha]_D^{25} = +145°$$

(1% in chloroform); ultraviolet maximum at 334 mμ (E=23,200).

*Analysis.*—Calcd. for C$_{29}$H$_{49}$NO$_2$: C, 78.48; H, 11.13; N, 3.15. Found: C, 78.76; H, 11.23; N, 3.15.

EXAMPLE 23

2-[(3-acetamido - 1 - piperidyl)methylene]-17α-methyletiocholan-17β-ol-3-one [I; R is H, R' is CH$_3$, X is H$_2$, Y and Y' are CH$_3$, Z is OH, B=N is 3-acetamido-1-piperidyl] was prepared from 2-hydroxymethylene-17α-methyletiocholan-17β-ol-3-one and 3-acetamidopiperidine according to the manipulative procedure described above in Example 1. The product was recrystallized twice from ether to give 2-[(3-acetamido-1-piperidyl)methylene]-17α-methyletiocholan-17β-ol-3-one in the form of a pale yellow powder, M.P. 139.8–147.0° C. (corr.), $$[\alpha]_D^{25} = +143°$$

(1% in chloroform); ultraviolet maximum at 334 mμ (E=17,600).

*Analysis.*—Calcd. for C$_{28}$H$_{44}$N$_2$O$_3$: C, 73.66; H, 9.64; N, 6.13. Found: C, 73.42; H, 9.40; N, 5.93.

EXAMPLE 24

2 - (dibenzylaminomethylene) - 17α-methyletiocholan-17β-ol-3-one [I; R is H, R' is CH$_3$, X is H$_2$, Y and Y' are CH$_3$, Z is OH, B=N is (C$_6$H$_5$CH$_2$)$_2$N] was prepared from 2 - hydroxymethylene-17α-methyletiocholan-17β-ol-3-one and dibenzylamine according to the manipulative procedure described above in Example 1. The product was recrystallized twice from ether to give 2-(dibenzylaminomethylene) - 17α-methyletiocholan-17β-ol-3-one in the form of pale yellow short needles, M.P. 157.0–161.4° C. (corr.), $[\alpha]_D^{25} = +48.1°$ (1% in chloroform); ultraviolet maximum at 332 mμ (E=21,900).

*Analysis.*—Calcd. for C$_{35}$H$_{45}$NO$_2$: C, 82.15; H, 8.87; N, 2.74. Found: C, 82.47; H, 8.85; N, 2.71.

EXAMPLE 25

2 - [(1-pyrrolidyl)methylene]-4-androstene-3,17-dione can be prepared by oxidizing 2-[(1-pyrrolidyl)methylene]-4-androsten-17β-ol-3-one (Example 1) with a solution of chromic oxide in pyridine at room temperature. The product is isolated by adding the reaction mixture to water, extracting the product with ethyl acetate and concentrating the ethyl acetate solution.

EXAMPLE 26

2-[2 - (1-hexamethylenimino)propylaminomethylene]-17α-methyl-4-androsten-17β-ol-3-one [II; R is H, R' is CH$_3$, X is H$_2$, Y and Y' are CH$_3$, Z is OH, B=N is (CH$_2$)$_6$NCH$_2$CH$_2$CH$_2$NH] was prepared from 5.00 g. of 2-hydroxymethylene-17α-methyl-4-androsten-17β-ol-3-one and 2.36 g. of 2-(1-hexamethylenimino)propylamine in 200 ml. of benzene according to the manipulative procedure described above in Example 1. The product was obtained in the form of an oil.

EXAMPLE 27

2 - aminomethylene - 17α-methyl-4-androsten-17β-ol-3-one [II; R is H, R' is CH$_3$, X is H$_2$, Y and Y' are CH$_3$, Z is OH, B=N is H$_2$N].

A rapid stream of dry ammonia gas was passed into a solution of 6.60 g. of 2-hydroxymethylene-17α-methyl-4-androsten-17β-ol-3-one in 200 ml. of chloroform at room temperature. After the solution was nearly saturated with ammonia, the solution was closed with a calcium chloride tube and allowed to stand at room temperature for eighteen hours. The reaction mixture was concentrated in vacuo, and the residue triturated with n-pentane and dried at 50° C. to give 6.71 g. of 2-aminomethylene-17α-methyl-4-androsten-17β-ol-3-one, M.P. 225–240° C. (uncorr.). A sample of the compound when recrystallized from a benzene-ethanol mixture was obtained in the form of yellow needles, M.P. 272–277° C. (uncorr.); ultraviolet maxima at 246 and 352 mμ (E=14,300 and 10,300).

*Analysis.*—Calcd. for $C_{21}H_{31}O_2N$: C, 76.55; H, 9.48; N, 4.25; O, 9.71. Found: C, 76.51; H, 9.17; N, 4.05; O, 9.60.

EXAMPLE 28

2-aminomethyleneandrostan-17β-ol-3-one [I; R is H, R' is H, X is $H_2$, Y and Y' are $CH_3$, Z is OH, B=N is $H_2N$] can be prepared by reacting 2-hydroxymethyleneandrostan-17β-ol-3-one with ammonia according to the manipulative procedure described above in Example 27. 2-aminomethyleneandrostan-17β-ol-3-one when recrystallized from ethanol with benzene added had the M.P. 256–259° C. (uncorr.); ultraviolet maximum at 315 mμ (E=15,300).

*Analysis.*—Calcd. for $C_{20}H_{31}O_2N$: C, 75.67; H, 9.84; N, 4.41. Found: C, 75.91; H, 9.94; N, 4.17.

EXAMPLE 29

2 - aminomethylene-17α-methylandrostan-17β-ol-3-one [I; R is H, R' is $CH_3$, X is $H_2$, Y and Y' are $CH_3$, Z is OH, B=N is $H_2N$] can be prepared by reacting 2-hydroxymethylene - 17α-methylandrostan-17β-ol-3-one with ammonia according to the manipulative procedure described above in Example 27. 2-aminomethylene-17α-methylandrostan-17β-ol-3-one when recrystallized from ethanol had the M.P. 272–274° C. (uncorr.); ultraviolet maximum at 315 mμ (E=14,600).

*Analysis.*—Calcd. for $C_{21}H_{33}O_2N$: C, 76.09; H, 10.03; N, 4.23. Found: C, 75.91; H, 10.00; N, 4.12.

EXAMPLE 30

2-aminomethylene-4-androsten-17β-ol-3-one [II; R is H, R' is H, X is $H_2$, Y and Y' are $CH_3$, Z is OH, B=N is $H_2N$] can be prepared by reacting 2-hydroxymethylene-4-androsten-17β-ol-3-one with ammonia according to the manipulative procedure described above in Example 27. 2-aminomethylene-4-androsten-17β-ol-3-one when recrystallized from ethanol had the M.P. 252–260° C. (dec.) (uncorr.); ultraviolet maxima at 246 and 352 mμ (E=18,300 and 13,100).

*Analysis.*—Calcd. for $C_{20}H_{29}NO_2$: C, 76.15; H, 9.27; N, 4.44. Found: C, 76.01; H, 8.89; N, 4.13.

EXAMPLE 31

2 - aminomethylene - 4-pregnene-17α,21-diol-3,11,20-trione 17,20;20,21-bismethylenedioxy derivative can be prepared by reacting 2-hydroxymethylene-4-pregnene-17α,21-diol-3,11,20-trione 17,20;20,21-bismethylenedioxy derivative with ammonia according to the manipulative procedure described above in Example 27. 2-aminomethylene-4-pregnene-17α,21-diol-3,11,20-trione 17,20;20,21-bismethylenedioxy derivative when recrystallized from a benzene-ethanol mixture had the M.P. 303–308° C. (uncorr.).

*Analysis.*—Calcd. for $C_{24}H_{31}NO_6$: C, 67.11; H, 7.28; N, 3.26. Found: C, 67.21; H, 7.49; N, 2.86.

EXAMPLE 32

2 - [(*1 - pyrrolidyl*)*methylene*]*androstan-17β-ol-3-one* [I; R is H, R' is H, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethyleneandrostan-17β-ol-3-one.

EXAMPLE 33

2 - [(*1-pyrrolidyl*)*methylene*]-*17α-ethylandrostan-17β-ol-3-one* [I; R is H, R' is $C_2H_5$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-17α-ethylandrostan-17β-ol-3-one.

EXAMPLE 34

2 - [(*1 - pyrrolidyl*)*methylene*]-*17α-ethyl-4-androsten-17β-ol-3-one* [II; R is H, R' is $C_2H_5$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2 - hydroxymethylene-17α-ethyl-4-androsten-17β-ol-3-one.

EXAMPLE 35

2 - [(*1 - pyrrolidyl*)*methylene*]-*17α-vinyl-4-androsten-17β-ol-3-one* [II; R is H, R' is $CH_2=CH$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2 - hydroxymethylene-17α-vinyl-4-androsten-17β-ol-3-one.

EXAMPLE 36

2 - [(*1-pyrrolidyl*)*methylene*]-*17α-ethynyl-4-androsten-17β-ol-3-one* [II; R is H, R' is CH≡C, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2 - hydroxymethylene - 17α-ethynyl-4-androsten-17β-ol-3-one.

EXAMPLE 37

2 - [(*1 - pyrrolidyl*)*methylene*]-*4-pregnen-20β-ol-3-one* [II; R is H, R' is $CH_3CH(OH)$, X is $H_2$, Y and Y' are $CH_3$, Z is H, B=N is $(CH_2)_4N$] can be prepared by replacing the 2-hydroxymethylene-4-androsten-17β-ol-3-one in Example 1 by a molar equivalent amount of 2-hydroxymethylene-4-pregnen-20β-ol-3-one.

EXAMPLE 38

2 - [(*1 - pyrrolidyl*)*methylene*]-*4-pregnene-3,20-dione* [II; R is H, R' is $CH_3CO$, X is $H_2$, Y and Y' are $CH_3$, Z is H, B=N is $(CH_2)_4N$] can be prepared by oxidizing 2-[(1-pyrrolidyl)methylene]-4-pregnen-20β-ol-3-one with chromic oxide in pyridine.

EXAMPLE 39

2 - [(*1 - pyrrolidyl*)*methylene*]-*17α-methyl-4,6-androstadien-17β-ol-3-one* [IIa; R is H, R' is $CH_3$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-17α-methyl-4,6-androstadien-17β-ol-3-one.

EXAMPLE 40

2 - [(*1-pyrrolidyl*)*methylene*]*4,6-androstadien-17β-ol-3-one* [IIa; R is H, R' is H, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-4,6-androstadien-17β-ol-3-one.

EXAMPLE 41

2 - [(*1-pyrrolidyl*)*methylene*]-*4,4,17α-trimethyl-5-androsten-17β-ol-3-one* can be prepared by replacing the 2-hydroxymethylene-4-androsten-17β-ol-3-one in Example 1 by a molar equivalent amount of 2-hydroxymethylene-4,4,17α-trimethyl-5-androsten-17β-ol-3-one.

EXAMPLE 42

2 - [(1-pyrrolidyl)methylene]-17α-methyl-19-norandrostan-17β-ol-3-one [I; R is H, R' is CH₃, X is H₂, Y is CH₃, Y' is H, Z is OH, B═N is (CH₂)₄N] can be prepared by replacing the 2-hydroxymethylene-4-androsten-17β-ol-3-one in Example 1 by a molar equivalent amount of 2-hydroxymethylene-17α-methyl-19-norandrostan-17β-ol-3-one.

EXAMPLE 43

2 - [1-(1-pyrrolidyl)ethylidene]-17β-acetoxyandrostan-3-one [I; R is CH₃, R' is H, X is H₂, Y and Y' are CH₃, Z is OCOCH₃, B═N is (CH₂)₄N] can be prepared by replacing the 2-hydroxymethylene-4-androsten-17β-ol-3-one in Example 1 by a molar equivalent amount of 2-acetyl-17β-acetoxyandrostan-3-one.

EXAMPLE 44

2-[1-(1 - pyrrolidyl)butylidene]androstan-17β-ol-one [I; R is CH₃(CH₂)₂, R' is H, X is H₂, Y and Y' are CH₃, Z is OH, B═N is (CH₂)₄N] can be prepared by replacing the 2-hydroxymethylene-4-androsten-17β-ol-3-one in Example 1 by a molar equivalent amount of 2-(n-butyryl)androstan-17β-ol-3-one.

EXAMPLE 45

2 - [(1-pyrrolidyl)methylene]-4,4-dimethyl-5-androsten-17β-ol-3-one can be prepared by replacing the 2-hydroxymethylene-4-androsten-17β-ol-3-one in Example 1 by a molar equivalent amount of 2-hydroxymethylene-4,4-dimethyl-5-androsten-17β-ol-3-one.

EXAMPLE 46

2 - [(1-pyrrolidyl)methylene]-4,4,17α-trimethylandrostan-17β-ol-3-one can be prepared by replacing the 2-hydroxymethylene-4-androsten-17β-ol-3-one in Example 1 by a molar equivalent amount of 2-hydroxymethylene-4,4,17α-trimethylandrostan-17β-ol-3-one.

EXAMPLE 47

2 - [(1-pyrrolidyl)methylene]-6α,17α-dimethyl-4-androsten-17β-ol-3-one can be prepared by replacing the 2-hydroxymethylene-4-androsten-17β-ol-3-one in Example 1 by a molar equivalent amount of 2-hydroxymethylene-6α,17α-dimethyl-4-androsten-17β-ol-3-one.

EXAMPLE 48

2 - [(1-pyrrolidyl)methylene]allopregnene-3,10-dione [I; R is H, R' is CH₃CO, X is H₂, Y and Y' are CH₃, Z is H, B═N is (CH₂)₄N] can be prepared by replacing the 2-hydroxymethylene-4-androsten-17β-ol-3-one in Example 1 by a molar equivalent amount of 2-hydroxymethylene-allopregnane-3,20-dione 20-ethylene glycol ketal and then hydrolyzing the ketal group by heating with dilute acetic acid.

EXAMPLE 49

2 - [(1-pyrrolidyl)methylene]-4-pregnene-17α,21-diol-3,11,20-trione [II; R is H, R' is CH₂(OH)CO, X is O, Y and Y' are CH₃, Z is OH, B═N is (CH₂)₄N] can be prepared by replacing the 2-hydroxymethylene-4-androsten-17β-ol-3-one in Example 1 by a molar equivalent amount of 2-hydroxymethylene-4-pregnene-17α,21-diol-3,11,20-trione.

EXAMPLE 50

2 - [(1-pyrrolidyl)methylene]-4-pregnene-17α,21-diol-3,11,20-trione can also be prepared by replacing the 2-hydroxymethylene-4-androsten-17β-ol-3-one in Example 1 by a molar equivalent amount of 2-hydroxymethylene-4 - pregnene-17α,21-diol-3,11,20-trione 17,20;20,21-bis-methylenedioxy derivative and heating the resulting product with dilute formic acid to remove the bismethylenedioxy group.

EXAMPLE 51

2 - [(1-pyrrolidyl)methylene]-4,4-dimethyl-5-pregnene-3,20-dione can be prepared by replacing the 2-hydroxymethylene-4-androsten-17β-ol-3-one in Example 1 by a molar equivalent amount of 2-hydroxymethylene-4,4-dimethyl-5-pregnene-3,20-dione 20-ethylene glycol ketal and hydrolyzing the ketal group by heating with dilute acetic acid.

EXAMPLE 52

2 - [(1-pyrrolidyl)methylene]-17α-propargylandrostan-17β-ol-3-one [I; R is H, R' is CH≡CCH₂, X is H₂, Y and Y' are CH₃, Z is OH, B═N is (CH₂)₄N] can be prepared by replacing the 2-hydroxymethylene-4-androsten-17β-ol-3-one in Example 1 by a molar equivalent amount of 2-hydroxymethylene-17α-propargylandrostan-17β-ol-3-one.

EXAMPLE 53

2 - [(1-pyrrolidyl)methylene]-4-pregnene-20,21-diol-3-one [II; R is H, R' is CH₂(OH)CH(OH), X is H₂, Y and Y' are CH₃, Z is H, B═N is (CH₂)₄N] can be prepared by replacing the 2-hydroxymethylene-4-androsten-17β-ol-3-one in Example 1 by a molar equivalent amount of 2-hydroxymethylene-4-pregnene-20,21-diol-3-one.

EXAMPLE 54

2 - [(1-pyrrolidyl)methylene]-9-fluoro-4-pregnene-17α,21-diol-3,11,20-trione can be prepared by replacing the 2-hydroxymethylene-4-androsten-17β-ol-3-one in Example 1 by a molar equivalent amount of 2-hydroxymethylene-9 - fluoro-4-pregnene17α,21-diol-3,11,20-trione 20-monoethylene glycol ketal and hydrolyzing the ketal group by heating with dilute acid.

EXAMPLE 55

2 - [(1 - pyrrolidyl)methylene]-4-pregnene-16α,17α,21-triol-3,20-dione 9β,11β-oxide can be prepared by replacing the 2-hydroxymethylene-4-androsten-17β-ol-3-one in Example 1 by a molar equivalent amount of 2-hydroxymethylene - 4 - pregnene - 16α,17a,21-triol-3,20-dione 9β,11β-oxide 20-monoethylene glycol ketal and hydrolyzing the ketal group by heating with dilute acetic acid.

EXAMPLE 56

2 - [(1 - pyrrolidyl)methylene]-4-pregnene-20,21-diol-3-one 20,21-acetonide can be prepared by replacing the 2-hydroxymethylene-4-androsten-17β-ol-3-one in Example 1 by a molar equivalent amount of 2-hydroxymethylene-4-pregnene-20,21-diol-3-one 20,21-acetonide.

EXAMPLE 57

2 - [(1 - pyrrolidyl)methylene] - 4,6-pregnadiene-17α,21-diol-3,11,20-trione [IIa; R is H, R' is HOCH₂CO, X is O, Y and Y' are CH₃, Z is OH, B═N is (CH₂)₄N] can be prepared by replacing the 2-hydroxymethylene-4-androsten-17β-ol-3-one in Example 1 by a molar equivalent amount of 2-hydroxymethylene-4,6-pregnadiene-17α,21-diol-3,11,20-trione 20-monoethylene glycol ketal and hydrolyzing the ketal group by heating with dilute acetic acid.

EXAMPLE 58

2 - [(1 - pyrrolidyl)methylene]-4-pregnene-17α,21-diol-3,20-dione [II; R is H, R' is HOCH₂CO, X is H₂, Y and Y' are CH₃, Z is OH, B═N is (CH₂)₄N] can be prepared by replacing the 2-hydroxymethylene-4-androsten-17β-ol-3-one in Example 1 by a molar equivalent amount of 2-hydroxymethylene-4-pregnene-17α,21-diol-3,20-dione 20-monoethylene glycol ketal and hydrolyzing the ketal group by heating with dilute acetic acid.

EXAMPLE 59

2 - [(1 - pyrrolidyl)methylene] - 6-methyl-4-pregnene-17α,21-diol-3,11,20-trione can be prepared by replacing the 2-hydroxymethylene-4-androsten-17β-ol-3-one in Example 1 by a molar equivalent amount of 2-hydroxymethylene - 6 - methyl-4-pregnene-17α,21-diol-3,11,20-trione 20-monoethylene glycol ketal and hydrolyzing the ketal group by heating with dilute acetic acid.

EXAMPLE 60

2 - [(1 - pyrrolidyl)methylene] - 9 - fluoro-6-methyl-4-pregnene-17α,21-diol-3,11,20-trione can be prepared by replacing the 2-hydroxymethylene-4-androsten-17β-ol-3-one in Example 1 by a molar equivalent amount of 2-hydroxymethylene - 9 - fluoro-6-methyl-4-pregnene-17α,21-diol-3,11,20-trione 20-monoethylene glycol ketal and hydrolyzing the ketal group by heating with dilute acetic acid.

EXAMPLE 61

2 - [(1 - pyrrolidyl)methylene]-4-pregnene-16α,17α,21-triol-3,11,20-trione can be prepared by replacing the 2-hydroxymethylene-4-androsten-17β-ol-3-one in Example 1 by a molar equivalent amount of 2-hydroxymethylene-4-pregnene-16α,17α,21-triol-3,11,20-trione 20-monoethylene glycol ketal and hydrolyzing the ketal group by heating with dilute acetic acid.

EXAMPLE 62

2 - [(1 - pyrrolidyl)methylene]-4,17(20)-pregnadiene-11β,21-diol-3-one can be prepared by replacing the 2-hydroxymethylene-4-androsten-17β-ol-3-one in Example 1 by a molar equivalent amount of 2-hydroxymethylene-4,17(20)-pregnadiene-11β,21-diol-3-one.

EXAMPLE 63

2 - [(1 - pyrrolidyl)methylene]androstane-6β,17β-diol-3-one can be prepared by replacing the 2-hydroxymethylene-4-androsten-17β-ol-3-one in Example 1 by a molar equivalent amount of 2-hydroxymethyleneandrostane-6β,17β-diol-3-one.

EXAMPLE 64

2 - [(1 - pyrrolidyl)methylene] - 17α-ethynyl-4-androsten-17β-ol-3-11-dione [II; R is H, R' is CH≡C, X is O, Y and Y' are CH₃, Z is OH, B=N is (CH₂)₄N] can be prepared by replacing the 2-hydroxymethylene-4-androsten-17β-ol-3-one in Example 1 by a molar equivalent amount of 2-hydroxymethylene-17α-ethynyl-4-androsten-17β-ol-3,11-dione.

EXAMPLE 65

2 - [(1-pyrrolidyl)methylene]-17α-methyl-4-androsten-17β-ol-3,11-dione [II; R is H, R' is CH₃, X is O, Y and Y' are CH₃, Z is OH, B=N is (CH₂)₄N] can be prepared by replacing the 2-hydroxymethylene-4-androsten-17β-ol-3-one in Example 1 by a molar equivalent amount of 2-hydroxymethylene - 17α - methyl-4-androsten-17β-ol-3,11-dione.

EXAMPLE 66

2 - [(1 - pyrrolidyl)methylene] - 4-androsten-17β-ol-3,11-dione [II; R is H, R' is H, X is O, Y and Y' are CH₃, Z is OH, B=N is (CH₂)₄N] can be prepared by replacing the 2-hydroxymethylene-4-androsten-17β-ol-3-one in Example 1 by a molar equivalent amount of 2-hydroxymethylene-4-androsten-17β-ol-3,11-dione.

EXAMPLE 67

2 - [(1 - pyrrolidyl)methylene] - 4-androstene-6β,17β-diol-3-one can be prepared by replacing the 2-hydroxymethylene-4-androsten-17β-ol-3-one in Example 1 by a molar equivalent amount of 2-hydroxymethylene-4-androstene-6β,17β-diol-3-one.

EXAMPLE 68

2 - [(1 - pyrrolidyl)methylene] - 17α - methyl-4-androstene-6β,17β-diol-3-one can be prepared by replacing the 2-hydroxymethylene-4-androsten-17β-ol-3-one in Example 1 by a molar equivalent amount of 2-hydroxymethylene-17α-methyl-4-androstene-6β,17β-diol-3-one.

EXAMPLE 69

2 - [(1 - pyrrolidyl)methylene]-4-androstene-14α,17β-diol-3-one can be prepared by replacing the 2-hydroxymethylene-4-androsten-17β-ol-3-one in Example 1 by a molar equivalent amount of 2-hydroxymethylene-4-androstene-14α,17β-diol-3-one.

EXAMPLE 70

2 - [(1 - pyrrolidyl)methylene] - 16β - methyl-4-androsten-17β-ol-3-one can be prepared by replacing the 2-hydroxymethylene-4-androsten-17β-ol-3-one in Example 1 by a molar equivalent amount of 2-hydroxymethylene-16β-methyl-4-androsten-17β-ol-3-one.

EXAMPLE 71

2 - [(1 - pyrrolidyl)methylene]-4-androstene-11α,17β-diol-3-one [II; R is H, R' is H, X is (H)(OH), Y and Y' are CH₃, Z is OH, B=N is (CH₂)₄N] can be prepared by replacing the 2-hydroxymethylene-4-androsten-17β-ol-3-one in Example 1 by a molar equivalent amount of 2-hydroxymethylene-4-androstene-11α,17β-diol-3-one.

EXAMPLE 72

2 - [(1 - pyrrolidyl)methylene]-19-nor-4-androstene-6β,17β-diol-3-one can be prepared by replacing the 2-hydroxymethylene-4-androsten-17β-ol-3-one in Example 1 by a molar equivalent amount of 2-hydroxymethylene-19-nor-4-androstene-6β,17β-diol-3-one.

EXAMPLE 73

2 - [(1 - pyrrolidyl)methylene] - 4-bromo-17α-methyl-4-androsten-17β-ol-3-one can be prepared by replacing the 2-hydroxymethylene-4-androsten-17β-ol-3-one in Example 1 by a molar equivalent amount of 2-hydroxymethylene-4-bromo-17α-methyl-4-androsten-17β-ol-3-one.

EXAMPLE 74

2 - [(1 - pyrrolidyl)methylene]-4-methyl-4-androsten-17β-ol-3-one can be prepared by replacing the 2-hydroxymethylene-4-androsten-17β-ol-3-one in Example 1 by a molar equivalent amount of 2-hydroxymethylene-4-methyl-4-androsten-17β-ol-3-one.

EXAMPLE 75

2 - [(1 - pyrrolidyl)methylene] - 17α - ethynyl - 4,6-androstadien-17β-ol-3-one [IIa; R is H, R' is HC≡C, X is H₂, Y and Y' are CH₃, Z is OH, B=N is (CH₂)₄N] can be prepared by replacing the 2-hydroxymethylene-4-androsten-17β-ol-3-one in Example 1 by a molar equivalent amount of 2 - hydroxymethylene - 17α - ethynyl - 4,6-androstadien-17β-ol-3-one.

EXAMPLE 76

2 - [(1 - pyrrolidyl)methylene]allopregnane - 6β,17α,21-triol-3,20-dione can be prepared by replacing the 2-hydroxymethylene-4-androsten-17β-ol-3-one in Example 1 by a molar equivalent amount of 2-hydroxymethyleneallopregnane - 6β,17α,21 - triol - 3,20 - dione 20 - monoethylene glycol ketal and hydrolyzing the ketal group by heating with dilute acetic acid.

EXAMPLE 77

2 - [(1 - pyrrolidyl)methylene] - 4 - pregnene - 12α,17α,21-triol-3,20-dione can be prepared by replacing the 2 - hydroxymethylene - 4 - androsten - 17β - ol - 3 - one in Example 1 by a molar equivalent amount of 2-hydroxymethylene - 4 - pregnene - 12α,17α,21 - triol - 3,20 - dione 20-monoethylene glycol ketal and hydrolyzing the ketal group by heating with dilute acetic acid.

EXAMPLE 78

2 - [(1 - pyrrolidyl)methylene]allopregnane - 17α,21-diol-3,12,20-trione can be prepared by replacing the 2-hydroxymethylene - 4 - androsten - 17β - ol - 3 - one in Example 1 by a molar equivalent amount of 2-hydroxymethyleneallopregnane - 17α,21 - diol - 3,12,20 - trione 20-monoethylene glycol ketal and hydrolyzing the ketal group by heating with dilute acetic acid.

EXAMPLE 79

2 - [(1 - pyrrolidyl)methylene] - 4,11-pregnadiene-3,20-dione can be prepared by replacing the 2-hydroxymethylene - 4 - androsten - 17β - ol - 3 - one in Example 1 by a molar equivalent amount of 2-hydroxy-methylene-4,11 - pregnadiene - 3,20 - dione 20 - monoethylene glycol ketal and hydrolyzing the ketal group by heating with dilute acetic acid.

EXAMPLE 80

2 - [(1 - pyrrolidyl)methylene] - 4 - pregnen - 17α-ol-3,20-dione [II; R is H, R' is CH$_3$CO, X is H$_2$, Y and Y' are CH$_3$, Z is OH, B=N is (CH$_2$)$_4$N] can be prepared by replacing the 2 - hydroxymethylene - 4 - androsten-17β-ol-3-one in Example 1 by a molar equivalent amount of 2 - hydroxymethylene - 4 - pregnen - 17α - ol - 3,20-dione 20-monoethylene glycol ketal and hydrolyzing the ketal group by heating with dilute acetic acid.

EXAMPLE 81

2 - [(1 - pyrrolidyl)methylene] - 17α - methyl - 4-pregnene-3,20-dione can be prepared by replacing the 2-hydroxymethylene - 4 - androsten - 17β - ol - 3 - one in Example 1 by a molar equivalent amount of 2-hydroxymethylene - 17α - methyl - 4 - pregnene - 3,20 - dione 20-monoethylene glycol ketal and hydrolyzing the ketal group by heating with dilute acetic acid.

EXAMPLE 82

2 - [(1 - pyrrolidyl)methylene] - 4 - pregnen - 6β - ol-3,20-dione can be prepared by replacing the 2-hydroxymethylene - 4 - androsten - 17β - ol - 3 - one in Example 1 by a molar equivalent amount of 2-hydroxy-methylene-4 - pregnen - 6β - ol - 3,20 - dione 20 - monoethylene glycol ketal and hydrolyzing the ketal group by heating with dilute acetic acid.

EXAMPLE 83

2 - [(1 - pyrrolidyl)methylene] - 4 - pregnene - 7β, 11β - diol - 3,20 - dione can be prepared by replacing the 2 - hydroxymethylene - 4 - androsten - 17β - ol - 3 - one in Example 1 by a molar equivalent amount of 2-hydroxymethylene - 4 - pregnene - 7β,11β - diol - 3,20 - dione 20-monoethylene glycol ketal and hydrolyzing the ketal group by heating with dilute acetic acid.

EXAMPLE 84

2 - [(1 - pyrrolidyl)methylene] - 12α - chloro - 4-pregnene-17α,21-diol-3,11,20-trione can be prepared by replacing the 2 - hydroxymethylene - 4 - androsten-17β-ol-3-one in Example 1 by a molar equivalent amount of 2 - hydroxymethylene - 12α - chloro - 4 - pregnene-17α,21 - diol - 3,11,20 - trione 20 - monoethylene glycol ketal and hydrolyzing the ketal group by heating with dilute acetic acid.

EXAMPLE 85

2 - [(1 - pyrrolidyl)methylene] - 18,19 - bisnor - 4-pregnene-3,20-dione [II; R is H, R' is CH$_3$CO, X is H$_2$, Y and Y' are H, Z is H, B=N is (CH$_2$)$_4$N] can be prepared by replacing the 2 - hydroxymethylene - 4 - androsten-17β-ol-3-one in Example 1 by a molar equivalent amount of 2 - hydroxymethylene - 18,19 - bisnor - 4-pregnene-3,20-dione 20-monoethylene glycol ketal and hydrolyzing the ketal group by heating with dilute acetic acid.

EXAMPLE 86

2 - [(1 - pyrrolidyl)methylene] - 4 - bromo - 4 - pregnene-17α,21-diol-3,11,20-trione can be prepared by replacing the 2 - hydroxymethylene - androsten - 17β-ol-3-one in Example 1 by a molar equivalent amount of 2 - hydroxymethylene - 4 - bromo - 4 - pregnene - 17α, 21 - diol - 3,11,20 - trione 20 - monoethylene glycol ketal and hydrolyzing the ketal group by heating with dilute acetic acid.

EXAMPLE 87

2 - [(1 - pyrrolidyl)methylene] - 4 - pregnene - 7α, 12α-diol-3,20-dione can be prepared by replacing the 2-hydroxymethylene - 4 - androsten - 17β - ol - 3 - one in Example 1 by a molar equivalent amount of 2-hydroxy-methylene - 4 - pregnene - 7α,12α - diol - 3,20 - dione 20-monoethylene glycol ketal and hydrolyzing the ketal group by heating with dilute acetic acid.

EXAMPLE 88

2 - [(1 - pyrrolidyl)methylene]allopregnane - 3,7,20-trione can be prepared by replacing the 2-hydroxymethylene - 4 - androsten - 17β - ol - 3 - one in Example 1 by a molar equivalent amount of 2-hydroxymethylene-allopregnane - 3,7,20 - trione 7,20 - bis(ethylene glycol ketal) and hydrolyzing the ketal groups by heating with dilute acetic acid.

EXAMPLE 89

2 - [(1 - pyrrolidyl)methylene] - 17α - ethylandrostan-17β-ol-3,7-dione can be prepared by replacing the 2-hydroxymethylene - 4 - androsten - 17β - ol - 3 - one in Example 1 by a molar equivalent amount of 2-hydroxymethylene - 17α - ethylandrostan - 17β - ol - 3,7 - dione 7-monoethylene glycol ketal and hydrolyzing the ketal group by heating with dilute acetic acid.

EXAMPLE 90

2 - [(1 - pyrrolidyl)methylene]allopregnane - 3,7-dione can be prepared by replacing the 2-hydroxymethylene - 4 - androsten - 17β - ol - 3 - one in Example 1 by a molar equivalent amount of 2-hydroxymethyleneallo-pregnane-3,7-dione 7-monoethylene glycol ketal and hydrolyzing the ketal group by heating with dilute acetic acid.

EXAMPLE 91

2-[(1-pyrrolidyl)methylene] - 6α,17α - dimethylandro-stan-17β-ol-3-one can be prepared by replacing the 2-hydroxymethylene-4-androsten-17β-ol - 3-one in Example 1 by a molar equivalent amount of 2-hydroxymethylene-6α,17a-dimethylandrostan-17β-ol-3-one.

EXAMPLE 92

2-[(1 - pyrrolidyl)methylene] - 17α - vinylandrostan-17β-ol-3-one [I; R is H, R' is CH$_2$=CH, X is H$_2$, Y and Y' are CH$_3$, Z is OH, B=N is (CH$_2$)$_4$N] can be prepared by replacing the 2-hydroxymethylene-4-androsten-17β-ol-3-one in Example 1 by a molar equivalent amount of 2-hydroxymethylene - 17α - vinylandrostan-17β-ol-3-one.

EXAMPLE 93

2-[(1-pyrrolidyl)methylene] - 17α - ethyl - 19-norandrostan-17β-ol-3-one [I; R is H, R' is C$_2$H$_5$, X is H$_2$, Y is CH$_3$, Y' is H, Z is OH, B=N is (CH$_2$)$_4$N] can be prepared by replacing the 2-hydroxymethylene-4-androsten-17β-ol-3-one in Example 1 by a molar equivalent amount of 2-hydroxymethylene-17α - ethyl - 19-norandrostan-17β-ol-3-one.

EXAMPLE 94

2-[(1 - pyrrolidyl)methylene]pregnane - 3,20 - dione [I; R is H, R' is CH$_3$CO, X is H$_2$, Y and Y' are CH$_3$, Z is H, B=N is (CH$_2$)$_4$N] can be prepared by replacing the 2-hydroxymethylene-4-androsten-17β-ol-3-one in Example 1 by a molar equivalent amount of 2-hydroxy-methylenepregnane-3,20-dione.

EXAMPLE 95

2-[(1 - pyrrolidyl)methylene] - 17α - ethynylandro-stan-17β-ol-3-one [I; R is H, R' is CH≡C, X is H$_2$, Y and Y' are CH$_3$, Z is OH, B=N is (CH$_2$)$_4$N] can be prepared by replacing the 2-hydroxymethylene-4-androsten-17β-ol-3-one in Example 1 by a molar equivalent amount of 2-hydroxymethylene - 17α - ethynylandrostan-17β-ol-3-one.

EXAMPLE 96

2-[(1-pyrrolidyl)methylene] - 17α - allyl-4-androsten-17β-ol-3-one [II; R is H, R' is CH$_2$=CHCH$_3$, X is H$_2$, Y and Y' are CH$_3$, Z is OH, B=N is (CH$_2$)$_4$N] can be prepared by replacing the 2-hydroxymethylene-4-androsten-17β-ol-3-one in Example 1 by a molar equivalent amount of 2-hydroxymethylene - 17α-allyl - 4 - androsten-17β-ol-3-one.

EXAMPLE 97

2-[(1 - pyrrolidyl)methylene] - 6α - methyl-17α-propynyl - 4 - androsten-17β-ol-3-one can be prepared by replacing the 2-hydroxymethylene-4-androsten - 17β - ol-3-one in Example 1 by a molar equivalent amount of 2-hydroxymethylene-6α-methyl - 17α - propynyl - 4 - androsten-17β-ol-3-one.

EXAMPLE 98

2-[(1 - pyrrolidyl)methylene] - 17α-ethyl-4,6-androstadien-17α-ol-3-one [IIa; R is H, R' is $C_2H_5$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-17α-ethyl-4,6-androstadien - 17β-ol-3-one.

EXAMPLE 99

2-[(1 - pyrrolidyl)methylene] - 17α - propyl-4-androsten-17β-ol-3-one [II; R is H, R' is $CH_3(CH_2)_2$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-17α-propyl-4-androsten-17β-ol-3-one.

EXAMPLE 100

2-[(1-pyrrolidyl)methylene] - 17α - propargyl - 4 - androsten-17β-ol-3-one [II; R is H, R' is CH≡$CCH_2$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-17α-propargyl-4-androsten-17β-ol-3-one.

EXAMPLE 101

2-[(1-pyrrolidyl)methylene] - 19 - norandrostan - 17β-ol-3-one [I; R is H, R' is H, X is $H_2$, Y is $CH_3$, Y' is H, Z is OH, B=N is $(CH_2)_4N$] can be prepared by replacing the 2-hydroxymethylene - 4 - androsten-17β-ol-3-one in Example 1 by a molar equivalent amount of 2-hydroxymethylene-19-norandrostan-17β-ol-3-one.

EXAMPLE 102

2 - [(1-pyrrolidyl)methylene] - 17α - propylandrostan-17β-ol-3-one [I; R is H, R' is $CH_3(CH_2)_2$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2 - hydroxymethylene - 17α - propylandrostan-17β-ol-3-one.

EXAMPLE 103

2-[(1-pyrrolidyl)methylene] - 4 - pregnene - 11β,17α,21-triol-3,20-dione - 17,20;20,21 - bismethylenedioxy derivative can be prepared by replacing the 2-hydroxymethylene-4-androsten-17β-ol-3-one in Example 1 by a molar equivalent amount of 2-hydroxymethylene-4-pregnene-11β,17α,21-triol - 3,20 - dione 17,20;20,21 - bismethylenedioxy derivative.

EXAMPLE 104

2-[(1-pyrrolidyl)methylene] - 9 - fluoro - 4 - pregnene-11β,17α,21-triol - 3,20 - dione 17,20;20,21 - bismethylenedioxy derivative can be prepared by replacing the 2-hydroxymethylene-4-androsten - 17β - ol - 3 - one in Example 1 by a molar equivalent amount of 2-hydroxymethylene - 9 - fluoro-4-pregnene-11β,17α,21-triol-3,20-dione 17,20;20,21-bismethylenedioxy derivative.

EXAMPLE 105

2-[(1 - pyrrolidyl)methylene] - 4 - pregnene - 17α,20-diol-3-one [II; R is H, R' is $CH_3CH(OH)$, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-4-pregnene - 17α,20-diol-3-one.

EXAMPLE 106

2-[(1 - pyrrolidyl)methylene]-9α-fluoro - 17α - methyl-4-androsten-17β-ol-3,11-dione can be prepared by replacing the 2-hydroxymethylene-4-androsten-17β-ol-3-one in Example 1 by a molar equivalent amount of 2-hydroxymethylene-9α-fluoro-17α-methyl - 4-androsten - 17β - ol-3,11-dione.

EXAMPLE 107

2-[(1 - pyrrolidyl)methylene] - 9β,11β - epoxy - 17α-methyl-4-androsten-17β-ol-3-one can be prepared by replacing the 2 - hydroxymethylene - 4 - androsten-17β-ol-3-one in Example 1 by a molar equivalent amount of 2-hydroxymethylene-9β,11β-epoxy-17α-methyl - 4 - androsten-17β-ol-3 - one. 2 - [(1-pyrrolidyl)methylene] - 9β,11β-epoxy-17α-methyl - 4 - androsten-17β-ol-3-one can be caused to react with hydrofluoric, hydrochloric, hydrobromic or hydriodic acid to give, respectively, 9α-fluoro-, 9α-chloro-, 9α-bromo- or 9α - iodo-2-[(1 - pyrrolidyl)-methylene] - 17α - methyl - 4-androstene-11β,17β-diol-3-one.

EXAMPLE 108

2-[(1-pyrrolidyl)methylene] - 4 - androstene-11β,17β-diol-3-one [II; R is H, R' is H, X is (H)(OH), Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene - 4 - androstene-11β,17β-diol-3-one.

EXAMPLE 109

2-[(1-pyrrolidyl)methylene]-17α - methyl - 19 - nor-4-androsten-17β-ol-3-one [II; R is H, R' is $CH_3$, X is $H_2$, Y is $CH_3$, Y' is H, Z is OH, B=N is $(CH_2)_4N$] can be prepared by replacing the 2-hydroxy-methylene-4-androsten-17β-ol-3-one in Example 1 by a molar equivalent amount of 2-hydroxymethylene - 17α-methyl-19-nor-4-androsten-17β-ol-3-one.

EXAMPLE 110

2-[(1-pyrrolidyl)methylene] - 17α-propynylandrostan-17β-ol-3-one [I; R is H, R' is $CH_4C$≡, X is $H_2$, Y and Y' are $CH_3$, Z is OH, B=N is $(CH_2)_4N$] can be prepared by replacing the 2-hydroxymethylene-4-androsten-17β-ol-3-one in Example 1 by a molar equivalent amount of 2-hydroxymethylene-17α-propynylandrostan-17β-ol-3-one.

EXAMPLE 111

2-[(1-pyrrolidyl)methylene] - 6-chloro-4,6-pregnadien-17α-ol-3,20-dione can be prepared by reacting 6-chloro-4,6-pregnadien-17α-ol-3,20-dione 20-monoethylene glycol ketal with ethyl formate in the presence of sodium methoxide, and reacting the resulting 2-hydroxy-methylene derivative with pyrrolidine according to the manipulative procedure described above in Example 1, followed by hydrolyzing the ketal group by heating with dilute acetic acid.

EXAMPLE 112

2-[(1-pyrrolidyl)methylene] - 6α-fluoro - 4-pregnene-11β,17α,21-triol-3,20-dione can be prepared by reacting 6α-fluoro-4-pregnene - 11β,17α,21-triol - 3,20-dione 20-monoethylene glycol ketal with ethyl formate in the presence of sodium methoxide, and reacting the resulting 2-hydroxymethylene derivative with pyrrolidine according to the manipulative procedure described above in Example 1, followed by hydrolyzing the ketal group by heating with dilute acetic acid.

EXAMPLE 113

2-[(1-pyrrolidyl)methylene] - 6α-methyl - 4-pregnen-17α-ol-3,20-dione can be prepared by reacting 6α-methyl- 4-pregnen-17α-ol-3,20-dione 20-monoethylene glycol ketal with ethyl formate in the presence of sodium methoxide, and reacting the resulting 2-hydroxymethylene derivative with pyrrolidine according to the manipulative procedure described above in Example 1, followed by hydrolyzing the ketal group by heating with dilute acetic acid.

EXAMPLE 114

2-[(1-pyrrolidyl)methylene]-21-fluoro - 6-methyl - 4,6-pregnadien-17α-ol-3,20-dione can be prepared by reacting 21-fluoro-6-methyl - 4,6-pregnadien-17α-ol-3,20-dione 20-monoethylene glycol ketal with ethyl formate in the presence of sodium methoxide, and reacting the resulting 2-hydroxymethylene derivative with pyrrolidine according to the manipulative procedure described above in Example 1, followed by hydrolyzing the ketal group by heating with dilute acetic acid.

EXAMPLE 115

2-[(1-pyrrolidyl)methylene] - 9α-fluoro - 4-pregnene-11β,16α,17α,21-tetrol-3,20-dione can be prepared by reacting 9α-fluoro-4-pregnene - 11β,16α,17α,21-tetrol-3,20-dione 20-monoethylene glycol ketal with ethyl formate in the presence of sodium methoxide, and reacting the resulting 2-hydroxymethylene derivative with pyrrolidine according to the manipulative procedure described above in Example 1, followed by hydrolyzing the ketal group by heating with dilute acetic acid.

EXAMPLE 116

2-[(1-pyrrolidyl)methylene] - 6α,9α - difluoro - 16α-methyl-4-pregnene - 11β,17α,21-triol-3,20-dione can be prepared by reacting 6α,9α-difluoro - 16α-methyl-4-pregnene-11β,17α,21-triol-3,20-dione 20-monoethylene glycol ketal with ethyl formate in the presence of sodium methoxide, and reacting the resulting 2-hydroxymethylene derivative with pyrrolidine according to the manipulative procedure described above in Example 1, followed by hydrolyzing the ketal group by heating with dilute acetic acid.

I claim:

1. A 3-oxo-steroid having from seventeen to about twenty-three carbon atoms exclusive of ester radicals and being further substituted in the 2-position by the grouping B=N—C(R)= wherein B=N is selected from the group consisting of primary amino, and basic secondary and tertiary amino having a molecular weight less than about 200, and R is selected from the group consisting of hydrogen and lower-alkyl.

2. A compound selected from the group consisting of (A) compounds having the formula

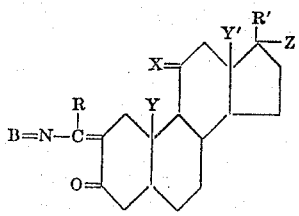

wherein R represents a member of the group consisting of hydrogen and lower-alkyl; R' represents a member of the group consisting of hydrogen, lower-alkyl, lower-alkenyl, lower-alkynyl, acetyl, ketalized acetyl, hydroxyacetyl, ketalized hydroxyacetyl, 1,2-dihydroxyethyl and 1-hydroxyethyl; X represents a member of the group consisting of H₂, (H)(OH) and O; Y and Y' represent members of the group consisting of hydrogen and methyl; Z represents a member of the group consisting of hydrogen and hydroxy, Z being restricted to hydroxy when R' represents a member of the group consisting of hydrogen, lower-alkyl, lower-alkenyl and lower-alkynyl; and B=N represents a member of the group consisting of primary amino, and basic secondary and tertiary amino having a molecular weight less than about 200; (B) carboxylic acid esters of hydroxy containing compounds under (A); (C) acid-addition salts of (A) and (B); and (D) lower-alkyl, lower-alkenyl and monocarbocyclic aryl-lower-alkyl quaternary ammonium salts of (A) and (B).

3. A compound according to claim 2 and having a double bond in the 4,5-position of the steroid nucleus.

4. A compound according to claim 2 and having a double bond in each of the 4,5-position and the 6,7-position.

5. A compound having the formula

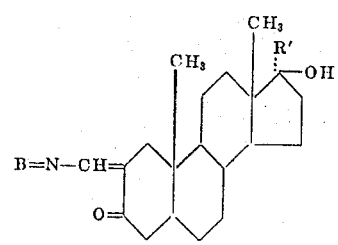

wherein R' represents lower-alkyl; and B=N represents di-lower-alkylamino.

6. A compound having the formula

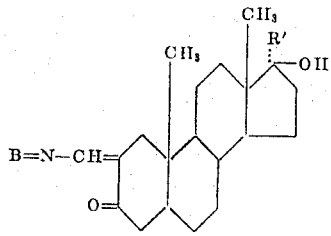

wherein R' represents lower-alkyl; and B=N represents polymethylenimino having from 5 to 7 ring members.

7. A compound having the formula

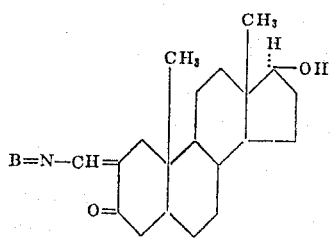

wherein B=N represents di-lower-alkylamino.

8. A compound having the formula

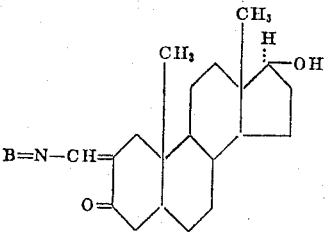

wherein B=N represents polymethylenimino having from 5 to 7 ring members.

9. A compound having the formula

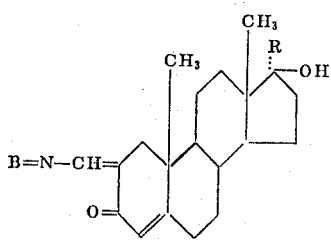

wherein R represents lower-alkyl; and B=N represents di-lower-alkylamino.

10. A compound having the formula

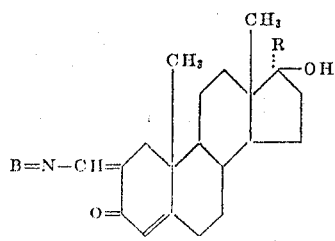

wherein R represents lower-alkyl; and B=N represents polymethylenimino having from 5 to 7 ring members.

11. A compound having the formula

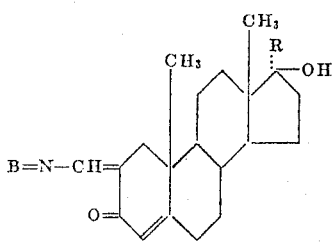

wherein R represent lower-alkyl; and B=N represents di-lower-alkylamino-lower-alkylamino.

12. A compound having the formula

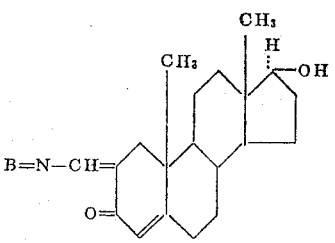

wherein B=N represents di-lower-alkylamino.

13. A compound having the formula

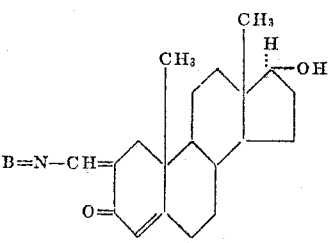

wherein B=N represents polymethylenimino having from 5 to 7 ring members.

14. 2 - [(1 - pyrrolidyl)methylene] - 4 - androsten-17β-ol-3-one.

15. 2 - [(1 - pyrrolidyl)methylene] - 17α - methyl-androstan-17β-ol-3-one.

16. 2 - [(1 - hexamethylenimino)methylene] - 17α-methylandrostan-17β-ol-3-one.

17. 2 - [(1 - piperidyl)methylene] - 17α - methyl androstan-17β-ol-3-one.
androstan17β-ol-3-one.

18. 2 - [2 - diethylaminoethylamino)methylene]-17α-methyl-4-androsten-17β-ol-3-one.

19. 2 - [(2 - methyl - 1 - piperidyl)methylene] - 17α-methyl-4-androsten-17β-ol-3-one.

20. 2 - (diethylaminomethylene)etiocholan - 17β-ol-3-one.

21. 2 - (diethylaminomethylene) - 17α - methyl-etiocholan-17β-ol-3-one.

22. 2 - [(1 - piperidyl)methylene] - 17α - methyl-eitocholan-17β-ol-3-one.

23. 2 - (dibutylaminomethylene) - 17α - methyl-etiocholan-17β-ol-3-one.

24. 2 - [(3 - acetamido - 1 - piperidyl)methylene]-17α-methyletiocholan-17β-ol-3-one.

25. 2 - (dibenzylaminomethylene) - 17α - methyl-etiochcolan-17β-ol-3-one.

26. The process for preparing a 3-oxo-steroid having from seventeen to about twenty-three carbon atoms exclusive of ester radicals and being further substituted in the 2-position by the grouping B=N—C(R)= wherein B=N is selected from the group consisting of primary amino, and basic secondary and tertiary amino having a molecular weight less than about 200, and R is selected from the group consisting of hydrogen and lower-alkyl, which comprises reacting a 3-oxo-steroid, having from seventeen to about twenty-three carbon atoms exclusive of ester radicals and being further substituted in the 2-position by the grouping HO—C(R)=, with a compound of the formula B=NH.

27. The process for preparing a compound selected from the group consisting of (A) compounds having the formula

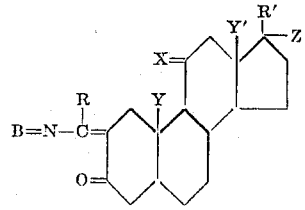

wherein R represents a member of the group consisting of hydrogen and lower-alkyl; R' represents a member of the group consisting of hydrogen, lower-alkyl, lower-alkenyl, lower-alkynyl, acetyl, ketalized acetyl, hydroxyacetyl, ketalized hydroxyacetyl, 1,2-dihydroxyethyl and 1-hydroxyethyl; X represents a member of the group consisting of $H_2$, (H)(OH) and O; Y and Y' represent members of the group consisting of hydrogen and methyl; Z represents a member of the group consisting of hydrogen and hydroxy, Z being restricted to hydroxy when R' represents a member of the group consisting of hydrogen, lower-alkyl, lower-alkenyl and lower-alkynyl; and B=N represents a member of the group consisting of primary amino, and basic secondary and tertiary amino having a molecular weight less than about 200; and (B) carboxylic acid esters of hydroxy containing compounds under (A), which comprises reacting a compound selected from the group consisting of (C) compounds having the formula

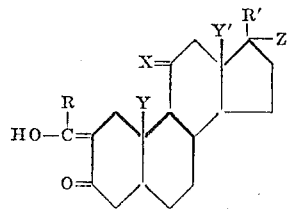

and (D) carboxylic acid esters of compounds under (C) containing hydroxy groups in addition to that in the substituent in the 2-position, with a compound of the formula B=NH.

28. A process according to claim 27 wherein the steroid has a double bond in the 4,5-position.

29. A compound according to claim 1 in which the 3-oxo-steroid is a steroid of the pregnane series characteristic of the progestational and cortical hormones.

30. A compound selected from the group consisting of compounds having the formula:

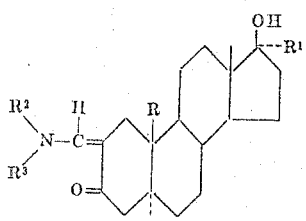

and the 4-dehydro derivatives thereof wherein R is selected from the group consisting of hydrogen and methyl; $R^1$ is selected from the group consisting of hydrogen, lower alkyl, lower alkenyl and lower alkynyl; $R^2$ and $R^3$ are selected from the group consisting of hydrogen, lower alkyl, aralkyl containing up to eight carbon atoms and di-lower alkylamino-lower alkyl, and $R^2$ and $R^3$ together with N represent a radical selected from the group consisting of piperidino, morpholino and pyrrolidino.

References Cited by the Examiner
UNITED STATES PATENTS
3,213,116  10/1965  Moersch et al. _____ 260—397.4

LEWIS GOTTS, Primary Examiner.
LESLIE H. GASTON, Examiner.
P. O'DAY, G. E. LANDE, Assistant Examiners.

UNITED STATES PATENT OFFICE

CERTIFICATE OF CORRECTION

Patent No. 3,265,686                        August 9, 1966

Raymond O. Clinton

It is hereby certified that error appears in the above numbered patent requiring correction and that the said Letters Patent should read as corrected below.

Column 3, lines 45 to 54, the left-hand portion of the formula should appear as shown below instead of as in the patent:

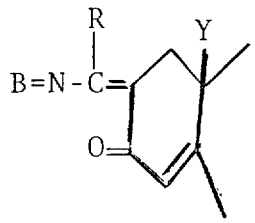

column 8, line 71, for "101.5°" read -- -101.5° --; column 9, line 20, for "2-(diethylaminoethylene)" read -- 2-(diethylaminomethylene) --; column 13, line 47, for "allopregnene-3,10-dione" read -- allopregnane-3,20-dione --; column 19, line 15, for "-17α-ol-" read -- -17β-ol- --; column 20, line 46, for "$CH_4C\equiv$" read -- $CH_3C\equiv C$ --; column 23, line 69, strike out "androstan17β-ol-3-one.".

Signed and sealed this 26th day of September 1967.

(SEAL)
Attest:

ERNEST W. SWIDER                        EDWARD J. BRENNER
Attesting Officer                    Commissioner of Patents